(12) United States Patent
Piersol et al.

(10) Patent No.: US 7,865,124 B2
(45) Date of Patent: Jan. 4, 2011

(54) PRE-SCANNING PRINTER WITH PAPER FINGERPRINTING

(75) Inventors: Kurt Piersol, Campbell, CA (US); John W. Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 923 days.

(21) Appl. No.: 11/694,088

(22) Filed: Mar. 30, 2007

(65) Prior Publication Data
US 2008/0240816 A1    Oct. 2, 2008

(51) Int. Cl.
G03G 15/00    (2006.01)
G03G 21/00    (2006.01)
G06K 9/74     (2006.01)

(52) U.S. Cl. .......................... 399/361; 399/391; 356/71
(58) Field of Classification Search .................. 356/71; 399/366, 363, 364, 381–393; G03G 15/00, G03G 21/00; G06K 9/74
See application file for complete search history.

(56) References Cited

U.S. PATENT DOCUMENTS

| | | | |
|---|---|---|---|
| 5,506,663 A * | 4/1996 | Ulrich et al. ................ | 399/151 |
| 5,662,039 A * | 9/1997 | Watanabe et al. ........... | 101/116 |
| 6,122,394 A | 9/2000 | Neukermans et al. | |
| 6,170,744 B1 | 1/2001 | Lee et al. | |
| 6,389,151 B1 | 5/2002 | Carr et al. | |
| 6,526,253 B2 | 2/2003 | Hayashi et al. | |
| 6,628,377 B1 | 9/2003 | Sabatini et al. | |
| 6,744,910 B1 | 6/2004 | McClurg et al. | |
| 6,827,279 B2 * | 12/2004 | Teraura ...................... | 235/492 |
| 6,917,691 B2 | 7/2005 | Evans et al. | |
| 6,930,803 B1 | 8/2005 | Suzuki | |
| 6,970,573 B2 | 11/2005 | Carr et al. | |
| 6,980,031 B2 | 12/2005 | Fowler | |
| 7,273,162 B2 | 9/2007 | Baker | |
| 7,593,542 B2 | 9/2009 | Abe et al. | |

(Continued)

FOREIGN PATENT DOCUMENTS

EP    1 202 225 A2    5/2002

(Continued)

OTHER PUBLICATIONS

Requirement for Restriction/Election for U.S. Appl. No. 11/495,613, mailed on Oct. 13, 2009, 6 pages.

(Continued)

*Primary Examiner*—Judy Nguyen
*Assistant Examiner*—'Wyn' Q Ha
(74) *Attorney, Agent, or Firm*—Townsend and Townsend and Crew LLP

(57) ABSTRACT

Techniques for scanning and generating fingerprints for articles prior to the use of the articles. The fingerprinting of the articles is performed such that it is decoupled from the process of using the articles. As a result, the fingerprinting process does not act as a bottleneck to the use of the articles. In one embodiment, a printer is provided that is configured to generate fingerprints for paper sheets loaded into the printer prior to the paper sheets being available for printing. The pre-fingerprinted sheets are then made available for printing. In this manner, the process of fingerprinting of the paper sheets is decoupled from the printing operations performed by the printer. As a result, the fingerprinting process does not act as a bottleneck to the printing process.

24 Claims, 8 Drawing Sheets

U.S. PATENT DOCUMENTS

| | | |
|---|---|---|
| 7,599,580 B2 | 10/2009 | King et al. |
| 7,603,434 B2 | 10/2009 | Svendsen |
| 7,712,675 B2 | 5/2010 | Balinsky et al. |
| 7,731,435 B2 | 6/2010 | Piersol et al. |
| 2002/0044809 A1* | 4/2002 | Hayashi et al. ............ 399/391 |
| 2002/0105666 A1 | 8/2002 | Sesek |
| 2002/0116618 A1 | 8/2002 | Muratani |
| 2003/0135420 A1 | 7/2003 | Culling et al. |
| 2004/0136764 A1 | 7/2004 | Meyerhofer |
| 2004/0196485 A1 | 10/2004 | Hikichi et al. |
| 2005/0021474 A1 | 1/2005 | Geist et al. |
| 2005/0283839 A1 | 12/2005 | Cowburn |
| 2006/0020803 A1 | 1/2006 | O'Hagan |
| 2006/0151990 A1 | 7/2006 | Cowburn |
| 2006/0294583 A1 | 12/2006 | Cowburn et al. |
| 2007/0025619 A1 | 2/2007 | Cowburn et al. |
| 2007/0027819 A1 | 2/2007 | Cowburn et al. |
| 2007/0028093 A1 | 2/2007 | Cowburn et al. |
| 2007/0028107 A1 | 2/2007 | Cowburn et al. |
| 2007/0028108 A1 | 2/2007 | Cowburn et al. |
| 2007/0036470 A1 | 2/2007 | Piersol et al. |
| 2007/0036599 A1 | 2/2007 | Piersol et al. |
| 2007/0053005 A1 | 3/2007 | Cowburn |
| 2007/0067248 A1 | 3/2007 | Chatte |
| 2007/0113076 A1 | 5/2007 | Cowburn et al. |
| 2007/0115497 A1 | 5/2007 | Cowburn |
| 2007/0153078 A1 | 7/2007 | Cowburn |
| 2007/0164729 A1 | 7/2007 | Cowburn et al. |
| 2007/0165208 A1* | 7/2007 | Cowburn et al. ............ 356/71 |

FOREIGN PATENT DOCUMENTS

| | | |
|---|---|---|
| EP | 1455284 A2 | 8/2004 |
| EP | 1 591 952 A1 | 11/2005 |
| EP | 1883039 A1 | 1/2008 |
| EP | 1883053 A1 | 1/2008 |
| GB | 2 411 954 | 9/2005 |
| GB | 2 417 074 A | 2/2006 |
| GB | 2 417 707 A | 3/2006 |
| JP | 2004112644 A | 4/2004 |
| JP | 2008071338 A | 8/2007 |
| JP | 2008-042906 A | 2/2008 |
| WO | WO 2005/088517 | 9/2005 |
| WO | WO 2005/088533 | 9/2005 |

OTHER PUBLICATIONS

Non-Final Office Action for U.S. Appl. No. 11/495,613, mailed on Dec. 31, 2009, 39 pages.

Final Office Action for U.S. Appl. No. 11/494,829, mailed on Dec. 31, 2009, 12 pages.

Extended European Search Report mailed Dec. 12, 2007 in European application No. 07113300.3-1228.

European Search Report for European Application 07112623 dated Aug. 17, 2007.

Notice of Allowance for U.S. Appl. No. 11/494,829, mailed on Feb. 24, 2010, 10 pages.

"'Fingerprinting' documents and packing—Unique surface imperfections serve as an easily identifiable feature in the fight against fraud." Brief Communications, Jul. 28, 2005, p. 475, vol. 436, Nature Publishing Group.

European Communication Pursuant to Article 94(3)EPC for European Application No. 07112623.9-2218, dated Mar. 3, 2009.

Non-Final Office Action for U.S. Appl. No. 11/494,829, mailed May 13, 2009, 21 pages.

European Communication Pursuant to Article 94(3)EPC for European Application No. 08251203.9, dated May 25, 2010, 6 pages.

Notice of Allowance for U.S. Appl. No. 11/495,613, mailed on Jul. 1, 2010, 18 pages.

* cited by examiner

PRE-SCANNING PRINTER WITH PAPER FINGERPRINTING

CROSS-REFERENCES TO RELATED APPLICATIONS

The present application herein incorporates by reference for all purposes the entire contents of the following:

(1) PCT Publication No. WO 2005/088533, entitled "Authenticity Verification Methods, Products, and Apparatuses" filed Mar. 9, 2005 and published Sep. 22, 2005;

(2) UK Patent Application GB 2417707A; and (3) U.S. application Ser. No. 11/495,613 filed Jul. 28, 2006.

BACKGROUND OF THE INVENTION

The present invention relates to fingerprinting of articles, and more particularly to techniques for fingerprinting an article prior to use of the article such that the use of the article is not impacted by the fingerprinting process.

Techniques have been developed for generating fingerprints for articles based upon the physical structure of the article. In one such technique, developed by Ingenia Technology Limited (ITL) located in London, United Kingdom (www.ingeniatechnology.com), a scanner is configured to scan one or more areas of an article using a light beam (e.g., a laser beam) and detect the scatter pattern of the light reflected from the scanned area of the article. The scatter pattern data is then used to generate a fingerprint or digital signature for the scanned article. Due to differences in the surface structure of the articles at the microscopic level, the light scatter pattern is generally different for different articles. As a result, the fingerprint generated for an article is highly distinctive of that article and can be used to identify or authenticate that article. ITL has developed scanners that are capable of generating fingerprints for articles such as paper sheets. A description of their technology is provided in PCT Publication No. WO 2005/088533, entitled "Authenticity Verification Methods, Products, and Apparatuses" filed Mar. 9, 2005 and published Sep. 22, 2005.

UK Patent Application GB 2417707A assigned to ITL describes techniques for using a scanner to obtain fingerprints or digital signatures for a sheet of paper as the paper is being printed. The digital signature obtained for a paper sheet is stored in a database with an image of what was printed on the paper sheet. Subsequently, the stored information is used to determine the authenticity of the paper sheet.

The fingerprint scans described above however tend to be slow due to the vast amount of data collection and processing involved in generating the fingerprints. The print speeds in a normal printer are usually however much higher than current technology allows for generating the fingerprints. For example, normal printers commonly run at a page every 2 seconds—this is roughly double the scan speed of conventional paper fingerprinting devices. Hence, applications which envision fingerprinting pages as part of the printing process, as described in PCT Publication No. WO 2005/088533 and UK Patent Application GB 2417707A, are likely to be very slow due to the bottleneck of fingerprint scanning and processing that occurs as part of the printing.

BRIEF SUMMARY OF THE INVENTION

Embodiments of the present invention provide techniques for scanning and generating fingerprints for articles prior to the use of the articles. The fingerprinting of the articles is performed such that it is decoupled from the process of using the articles. As a result, the fingerprinting process does not act as a bottleneck to the use of the articles. In one embodiment, a printer is provided that is configured to generate fingerprints for paper sheets loaded into the printer prior to the paper sheets being available for printing. The pre-fingerprinted sheets are then made available for printing. In this manner, the process of fingerprinting of the paper sheets is decoupled from the printing operations performed by the printer. As a result, the fingerprinting process does not act as a bottleneck to the printing process.

According to an embodiment of the present invention, techniques are provided for fingerprinting paper sheets in a device such as a printer. A fingerprint is generated for a paper sheet from a first tray in the printer. Information is stored in memory associating the fingerprint with the paper sheet. The paper sheet is then transported back to the first tray, wherein the paper sheet is made available for printing. In one embodiment, the process of generating a fingerprint may be performed upon detecting insertion of the first tray in the printer. The system responsible for fingerprinting may comprise a scanner that receives the paper sheet to be fingerprinted from the first tray.

A request may be received to print an electronic document. In one embodiment, in response, at least one fingerprinted paper sheet is selected from the first tray for printing the electronic document, and a printed document is generated using the at least one fingerprinted paper sheet from the first tray. Information may be stored for the at least one fingerprinted paper sheet associating the fingerprint generated for the at least one fingerprinted paper sheet with information related to the electronic document. The information related to the electronic document may comprise information such as information related to contents of the electronic document printed on the at least one fingerprinted paper sheet.

In one embodiment, a non-fingerprinted paper sheet may be selected from a second tray in the printer different from the first tray and the printed document may be generated using the non-fingerprinted paper sheet. The request to print may also specify a page of the electronic document for which a fingerprinted paper sheet is to be used for printing the electronic document.

According to an embodiment of the present invention, paper sheets may be marked so as to avoid re-fingerprinting of a previously fingerprinted paper sheet. In this embodiment, prior to fingerprinting a paper sheet, it is determined if the paper sheet received from the first tray for fingerprinting comprises a mark indicating that the paper sheet has been previously fingerprinted. A fingerprint is generated for the paper sheet only if it is determined that the paper sheet does not comprise the mark or the paper sheet comprises a mark that is not decipherable by the printer. After a paper sheet has been fingerprinted, it is marked to indicate that the paper sheet has been fingerprinted.

Different techniques may be used to mark a paper sheet. In one embodiment, the paper sheet may be marked by printing a code on the paper sheet. The code may be for example a barcode, a code printed using infrared ink, or a code printed using an ink that becomes transparent upon exposure to light. Steganographic techniques may also be used to mark a paper sheet.

According to an embodiment of the present invention, techniques are provided for fingerprinting a paper sheet in a printer. A set of one or more paper sheets may be selected from a stack of paper sheets stored in a first tray of the printer. A fingerprint may then be generated for each paper sheet in the selected set of paper sheets. Information may be stored in memory, for each paper sheet in the set of paper sheets, associating the fingerprint generated for the paper sheet with the paper sheet. After fingerprinting, the set of paper sheets may be transported to a second tray in the printer separate from the first tray. In one embodiment, a request may be received to print an electronic document. In response, a printed document may be generated wherein the printed document comprises a fingerprinted paper sheet from the second tray and a non-fingerprinted paper sheet from the first tray.

According to an embodiment of the present invention, techniques are provided for preparing an article for use by a device configured to perform a function using the article. The article is fingerprinted and only then is it made available for use by the device for performing the function.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention are configured to scan and generate fingerprints for articles prior to the use of the articles. The fingerprinting of the articles is performed such that it is decoupled from the process of using the articles. As a result, the fingerprinting process does not act as a bottleneck to the use of the articles.

According to an embodiment of the present invention, a printer is provided that is configured to generate fingerprints for paper sheets loaded into the printer prior to the paper sheets being available for printing. The pre-fingerprinted sheets are then made available for printing. In this manner, the process of fingerprinting of the paper sheets is decoupled from the printing operations performed by the printer. As a result, the fingerprinting process does not act as a bottleneck to the printing process.

Figure 1:
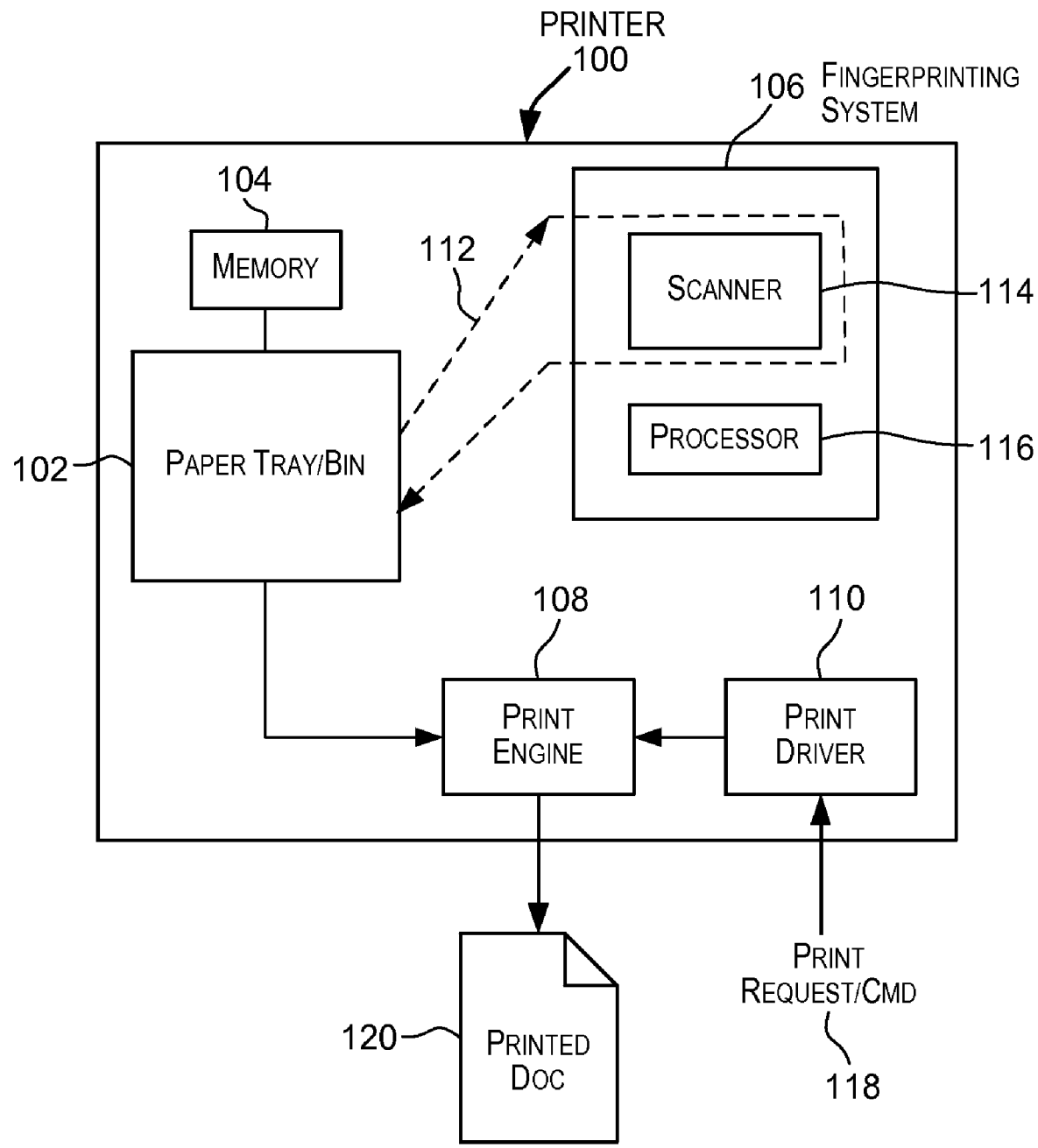
FIG. 1 is a simplified block diagram of a printer that incorporates an embodiment of the present invention.

FIG. 1 is a simplified block diagram of a printer 100 that incorporates an embodiment of the present invention. Printer 100 depicted in FIG. 1 is merely illustrative of an embodiment incorporating the present invention and is not intended to limit the scope of the invention as recited in the claims. Embodiments of the present invention may be incorporated into various other systems and devices. One of ordinary skill in the art would recognize other variations, modifications, and alternatives. Printer 100 may be embodied in various different configurations, as a standalone printer, as a networked printer, as part of a multifunction printer or device, in a facsimile machine, and the like.

As depicted in FIG. 1, printer 100 comprises a paper bin/tray 102, a memory 104 associated with the tray, a fingerprinting system 106, a print engine 108, and a print driver 110. Paper bin/tray 102 provides an area for storing paper sheets that are to be used for printing. A user may load paper into printer 100 by putting the paper sheets in tray 102 and then inserting paper tray 102 into printer 100 or by closing paper tray 102. For purposes of this application, inserting a paper tray in printer 100 is intended to also include closing tray/bin 102 of printer 100.

Fingerprinting system 106 is configured to scan one or more paper sheets from tray 102 and generate fingerprints for the scanned sheets. In one embodiment, fingerprinting system 106 is configured to detect when a paper tray 102 has been inserted into printer 100. Upon detecting an insertion or closure of paper tray 102, fingerprinting system 106 is configured to scan and generate fingerprints for the paper sheets stored in tray 102 prior to the paper sheets being available for printing. As part of the fingerprinting process, a paper sheet is transported from tray 102 to fingerprinting system 106, fingerprinting system 106 generates a fingerprint for the paper sheet, and then the fingerprinted sheet is transported back to tray 102. Accordingly, a paper sheet selected for fingerprinting from tray 102 is returned back to tray 102 after the fingerprinting process (as depicted by paper path 112 depicted in FIG. 1). In one embodiment, the paper sheets may be returned to tray 102 in the same order as they were originally positioned in tray 102. In other embodiments, the papers may be replaced in the tray in reverse order, or in any other order, so long as that order is known and predictable and can be used to make a one-to-one mapping between scanned fingerprints and the position of the paper in the tray.

In one embodiment, all the paper sheets in the stack of paper sheets in tray 102 are fingerprinted. This avoids problems with the paper sheets being removed or reordered within the paper stack in tray 102 since a previous fingerprinting operation. In alternative embodiments, as described below in further detail, a subset of the paper sheets in the paper stack stored in tray 102 may be fingerprinted.

In the embodiment depicted in FIG. 1, fingerprinting system 106 comprises a scanner 114 and a processor 116. Scanner 114 is configured to scan one or more areas of a paper sheet and collect data points representative of the light scattered by the scanned areas. Processor 116 is configured to control the operations of scanner 114 and generate a fingerprint for a paper sheet based upon the data points collected by scanner 114 from scanning the paper sheet.

Scanner 114 is configured to scan and collect data points for an article such as a paper sheet. The data points are then used to generate a fingerprint (or signature) for the paper sheet. In one embodiment, scanner 114 is capable of directing a coherent light beam (e.g., a laser beam) onto an area of the surface of a paper sheet. The area of the paper sheet that is impinged by the light beam is referred to as the scanned area of the paper sheet. Scanner 114 is configured to detect signal components scattered from the scanned area of the paper sheet. During a scan, scanner 114 is configured to detect and record a large number of details of the way the light beam is reflected off the surface of the scanned paper sheet. Scanner 114 may comprise a set of one or more detectors that are configured to detect the scattered light signals and collect data points corresponding to the scattering.

The detectors in scanner 114 are sufficiently sensitive to detect scattered light due to surface irregularities of the paper sheet of less than a few hundred nanometers in size. Due to differences in surfaces of articles at the microscopic level, a unique scatter response is received from each article. Microscopic irregularities on the surface of the article cause the light beam to be scattered differently for different articles. Accordingly, for a paper sheet, due to the structure of the paper fibers of the paper sheet, the paper sheet surface provides a complex scattering response of the laser beam that is unique and characteristic of the paper sheet. The scatter response for one paper sheet is different from the scatter response from another paper sheet since, at the microscopic level, the structures of the surfaces are different. The scattered response for a paper sheet may thus be used as a basis for generating a fingerprint (or signature) for the paper sheet that is unique to the paper sheet.

Figure 2:
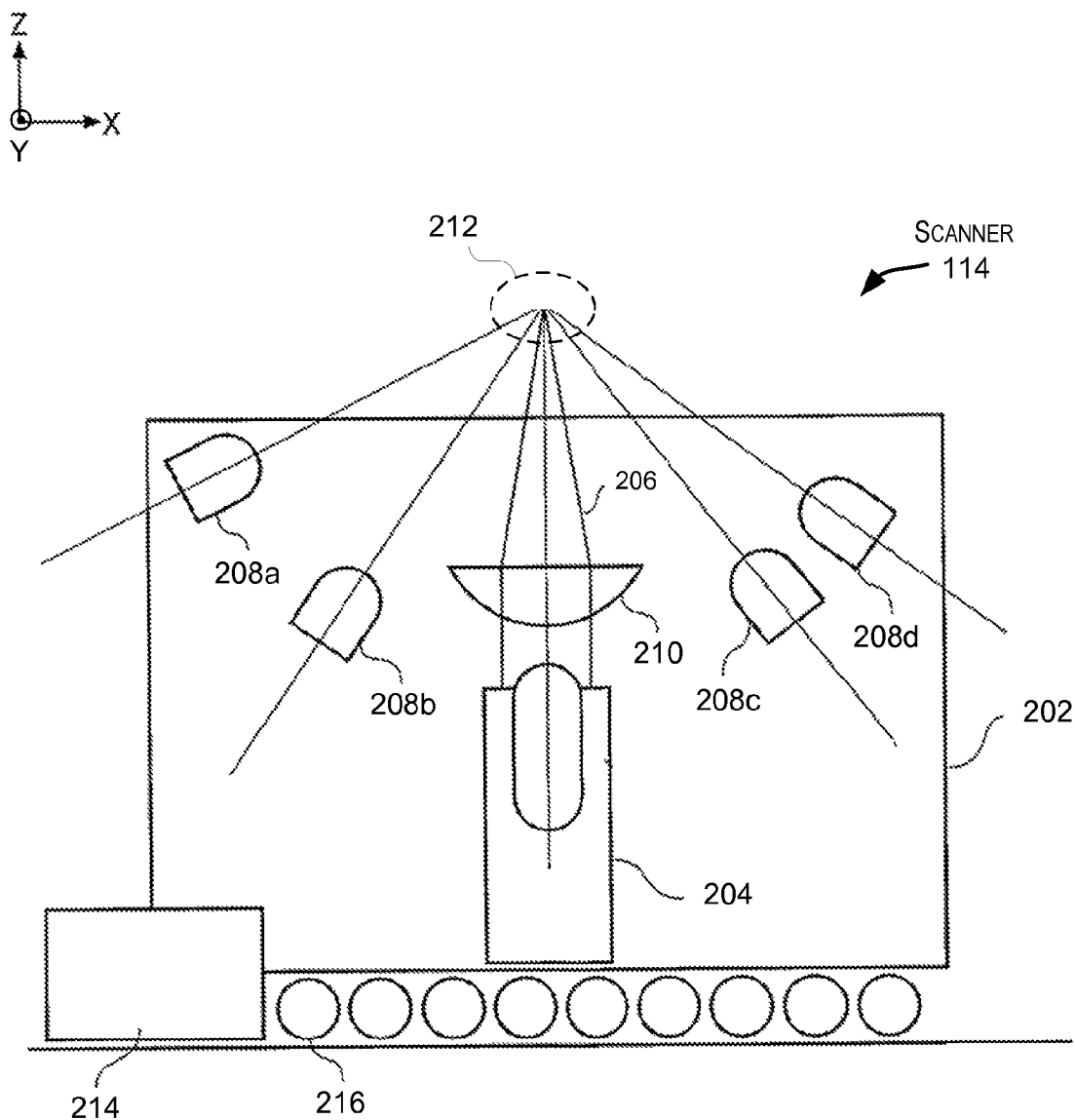
FIG. 2 is a schematic view of an illustrative embodiment of a scanner depicted in FIG. 1 in accordance with an embodiment of the present invention.

FIG. 2 is a schematic view of an illustrative embodiment of a scanner 114 depicted in FIG. 1 in accordance with an embodiment of the present invention. The components of scanner 114 may be enclosed in a housing or assembly 202. In the embodiment depicted in FIG. 2, the principal optical components of scanner 114 include a laser source 204 for generating a coherent laser beam 206 for scanning an area of a surface of an article such as a paper sheet. Laser beam 206 is focused by a lens 210 to form a focused beam that passes through a reading volume 212.

Scanner 114 comprises a detector arrangement comprising a plurality of photodetector elements 208a-208d. Although the specific embodiment illustrated in FIG. 2 shows four photodetector elements, it will be appreciated that other numbers of photodetector elements may be employed. Photodetectors 208a-208d are distributed about the laser beam at different angles to detect light scattered from the scanned area of the article present in the reading volume 212.

A drive motor 214 is arranged in housing 202 for providing motion of the optics components via suitable bearings 216 or other means. Drive motor 214 serves to move the coherent beam and this controls the area of the article that is scanned. Drive motor 214 also controls the speed or rate of the scan. The intensity of light beam 206, speed of drive motor 214, and the position of photodetectors 208a-208d may be user-controllable.

Some of the basic operations of a scanner such as scanner 114 depicted in FIGS. 1 and 2 (and other figures) are also described in PCT Publication No. WO 2005/088533, the entire contents of which are herein incorporated by reference for all purposes.

In one embodiment, fingerprinting system 106 may be implemented in paper tray 102. Paper trays often have significant extra space because of the need to handle large sheets. Fingerprinting system 106 may be contained in this extra space. In other embodiments, fingerprinting system 106 may be attached to tray 102. Memory 104 may also be part of tray 102.

The scanning and data collection technique used by scanner 114 described above is strongly dependent upon the manner in which scanner 114 performs the scan. For example, the data points collected from a scan are strongly dependent upon the scanned area of article or paper sheet. Different scanned areas of the same paper sheet may yield different data points and thus different fingerprints for the same paper sheet. Accordingly, in one embodiment, the area (or areas) of a paper sheet scanned by scanner 114 is fixed such that the same area is scanned during subsequent scans. In another embodiment, the parameters (including the scanned area) used for scanning from one scan to another may be different, as described in U.S. application Ser. No. 11/495,613 filed Jul. 28, 2006.

Referring back to FIG. 1, data points collected by scanner 114 for an article such as a paper sheet are communicated to processor 116 for generation of a digital fingerprint for the article or paper sheet. Processor 116 is configured to process the data points received from scanner 114 and produce a digital fingerprint for the scanned article.

The fingerprint information generated by fingerprinting system 106 for a paper sheet is then stored. In one embodiment, the fingerprint information for fingerprinted paper sheets may be stored in a memory 104 associated with tray 102 in which the fingerprinted sheets are stored. Information is stored associating the generated fingerprints with their corresponding paper sheets. In one embodiment, the association is made by storing information identifying the positions of the paper sheets in the paper stack in tray 102 and associating each position with a fingerprint generated for the paper sheet in that position. The contents of memory 104 may be reset each time tray 102 is removed to avoid any problems caused by possible reordering of the papers in tray 102.

As previously described, in one embodiment, after a paper sheet has been fingerprinted by fingerprinting system 106, the paper sheet is returned back to tray 102. The paper sheets may be returned to tray 102 in the same order as present in tray 102 prior to the fingerprinting. This may be done, for example, by starting the fingerprinting operation on sheets from the bottom of the stack of sheets, and returning the sheets back to the tray on the top. As part of this process, once a page is found that has already been fingerprinted, this indicates that all the paper sheets in the tray have been fingerprinted and fingerprinting may be stopped. A small pin can also be inserted between the fingerprinted sheets and the non-fingerprinted sheets to separate them. Once all the sheets have been fingerprinted, the fingerprinted paper sheets are then made available for printing. In other embodiments, the papers may be replaced in the tray in reverse order, or in any other order, so long as that order is known and predictable and can be used to make a one-to-one mapping between scanned fingerprints and the position of the paper in the tray.

Print driver 110 provides an interface for receiving requests 118 to print one or more electronic documents. Examples of an electronic document is a document created using a word editor, an image, a photograph, a web page, a spreadsheet, an email, or any document stored in electronic form. Upon receiving a request to print an electronic document, print driver 110 is configured to send a signal to print engine 108 to print the electronic document. In the embodiment depicted in FIG. 1, print driver 110 is part of printer 100. In an alternative embodiment, print driver 110 may be part of or resident on a processing system that is coupled to printer 100 and which is configured to initiate print requests for printer 100. The processing system may be coupled to printer 100 via wired or wireless communication links.

Print engine or print module 108 is configured to generate a printed document 120 by printing the electronic document using one or more paper sheets from paper tray 102. As part of the printing process, print engine 108 is configured to select a paper sheet from tray 102 for printing and then use the sheet for printing. Multiple sheets may be used for printing a multi-page electronic document. The resultant printed document 120 comprises pages that have been fingerprinted. These fingerprints may then be used to authenticate the document 120 (for example, as described in PCT Publication No. WO 2005/088533 and UK Patent Application GB 2417707A).

In addition to generating a physical printed document 120 using one or more paper sheets from tray 102, print engine 108 is also configured to store information related to the sheets used for the printing. In one embodiment, print engine 108 is configured to update the information stored in memory 104. As previously described, after the fingerprinting operation is performed by fingerprinting system 106, information associating the fingerprints with their corresponding paper sheets is stored in memory 104. In one embodiment, the association is made by storing information identifying the positions of the paper sheets in the paper stack in tray 102 and associating each position with a fingerprint generated for the paper sheet in that position. After a fingerprinted paper sheet has been used for generating printed document 120, the entry for that sheet may be updated with information related to the electronic document which is printed using the sheet. For example, in one embodiment, the entry for a fingerprinted paper sheet may be updated with information identifying the contents printed on that sheet. In another embodiment, the entry for a fingerprinted paper sheet in memory 104 may be updated with information identifying the electronic document or page of the electronic document printed on that sheet.

Information related to the printed sheets may be stored in memory 104 or in some other memory location. For example, in the embodiment depicted in FIG. 1, the information may be stored locally in memory 104 of printer 100. In alternative embodiments, the information may be communicated and stored on some other device or system or memory location that is remote from printer 100 and may be coupled to printer 100 via communication links or via a communication network (e.g., the Internet). Printer 100 may then access this information from the remote locations.

Figure 3:
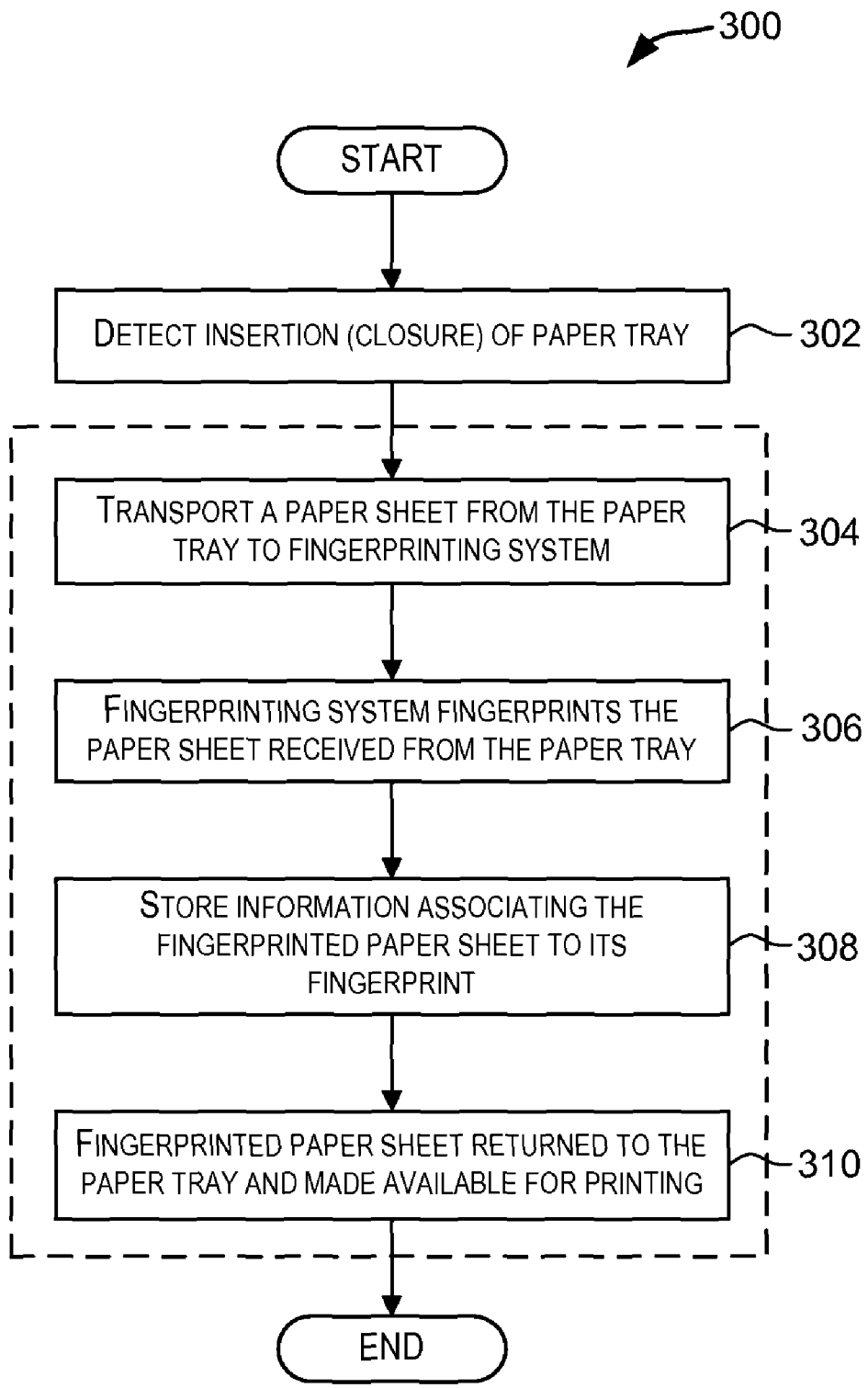
FIG. 3 is a simplified high-level flowchart depicting a fingerprinting process performed by a printer according to an embodiment of the present invention.

FIG. 3 is a simplified high-level flowchart 300 depicting a fingerprinting process performed by a printer according to an embodiment of the present invention. The processing depicted in FIG. 3 may be performed by software modules (code, instructions), hardware modules, or combinations thereof. The processing may be performed by fingerprinting system 106. Flowchart 300 depicted in FIG. 3 is merely illustrative of an embodiment of the present invention and is not intended to limit the scope of the present invention. Other variations, modifications, and alternatives are also within the scope of the present invention.

As depicted in FIG. 3, fingerprinting system 106 detects when a paper tray has been inserted in the printer (step 302). Steps 304, 306, 308, and 310 are performed upon detecting insertion of a paper tray in the printer. A paper sheet is transported from the paper tray to the fingerprinting system for fingerprinting (step 304). The fingerprinting system scans the paper sheet received from the paper tray and generates a fingerprint for the paper sheet (step 306). Information is then stored associating the fingerprinted paper sheet with the generated fingerprint (step 308). The information may be stored in a memory associated with the paper tray. In one embodiment, the position of the fingerprinted sheet within the stack of paper sheets in the paper tray is stored and the generated fingerprint is associated with the position information, thereby associating the fingerprint with the paper sheet. The fingerprinted paper sheet is then returned back to the paper tray from where it was removed and it made available for printing (step 310). The fingerprinted paper sheet may then subsequently be used to generate a printed document in response to a print request/command.

Steps 304, 306, 308, and 310 may be applied to multiple paper sheets stored in the paper tray. The paper sheets may be returned to tray 102 in the same order as they were originally positioned in tray 102. In other embodiments, the papers may be replaced in the tray in reverse order, or in any other order, so long as that order is known and predictable and can be used to make a one-to-one mapping between scanned fingerprints and the position of the paper in the tray. In one embodiment, all the paper sheets in the paper tray are fingerprinted. In alternative embodiments, less than all sheets (a subset) in the tray may be fingerprinted.

As described above, a paper sheet that is to be fingerprinted is not made available for printing until after the paper sheet has been fingerprinted. Further, the fingerprinting operation is initiated upon the paper sheet being loaded into a printer and not in response to a print command. In this manner, the paper sheets are fingerprinted offline from the actual printing operation. The fingerprinting operation is thus decoupled from the printing operation. A stack of pre-scanned and pre-fingerprinted paper sheets are thus made available for use by the printer. When the printer receives a print request, the printer may select one or more fingerprinted paper sheets from the stack of pre-fingerprinted paper sheets for the printing. The fingerprinting operation does not have to be performed inline with the printing operation. As a result, the fingerprinting operation does not act as a bottleneck for the printing operation since a stack of previously fingerprinted sheets is available for printing. The printing operation may thus be performed at high speeds as desired.

In the embodiment described above, each paper sheet in the stack of paper sheets in tray 102 is fingerprinted each time that tray 102 is inserted into printer 100. Since the fingerprinting operation is expensive in terms of time, it is desirable that the number of times this operation is performed be reduced. According to one technique, a paper sheet that has been fingerprinted is marked to indicate that the sheet has been fingerprinted. In such an embodiment, fingerprinting system 106 may be configured to mark each paper sheet when that paper sheet is fingerprinted. In such an embodiment, as part of the fingerprinting operation fingerprinting system 106 is configured to first check if a paper sheet presented for fingerprinting contains a mark that can be interpreted by fingerprinting system 106 and that indicates to fingerprinting system 106 that the sheet has been previously fingerprinted by fingerprinting system 106. If such a mark is found on the paper sheet then fingerprinting for that paper sheet is skipped since the paper sheet has been previously fingerprinted. In this manner, only a paper sheet that is unmarked (thereby indicating that the paper sheet has not been previously fingerprinted) or whose mark is not understandable by fingerprinting system 106 (possibly because the paper sheet has been marked by another printer and then inserted into yet another printer that is fingerprinting the paper sheet) is fingerprinted. This produces cost savings in terms of time by avoiding re-fingerprinting of a previously fingerprinted sheet.

Figure 4:
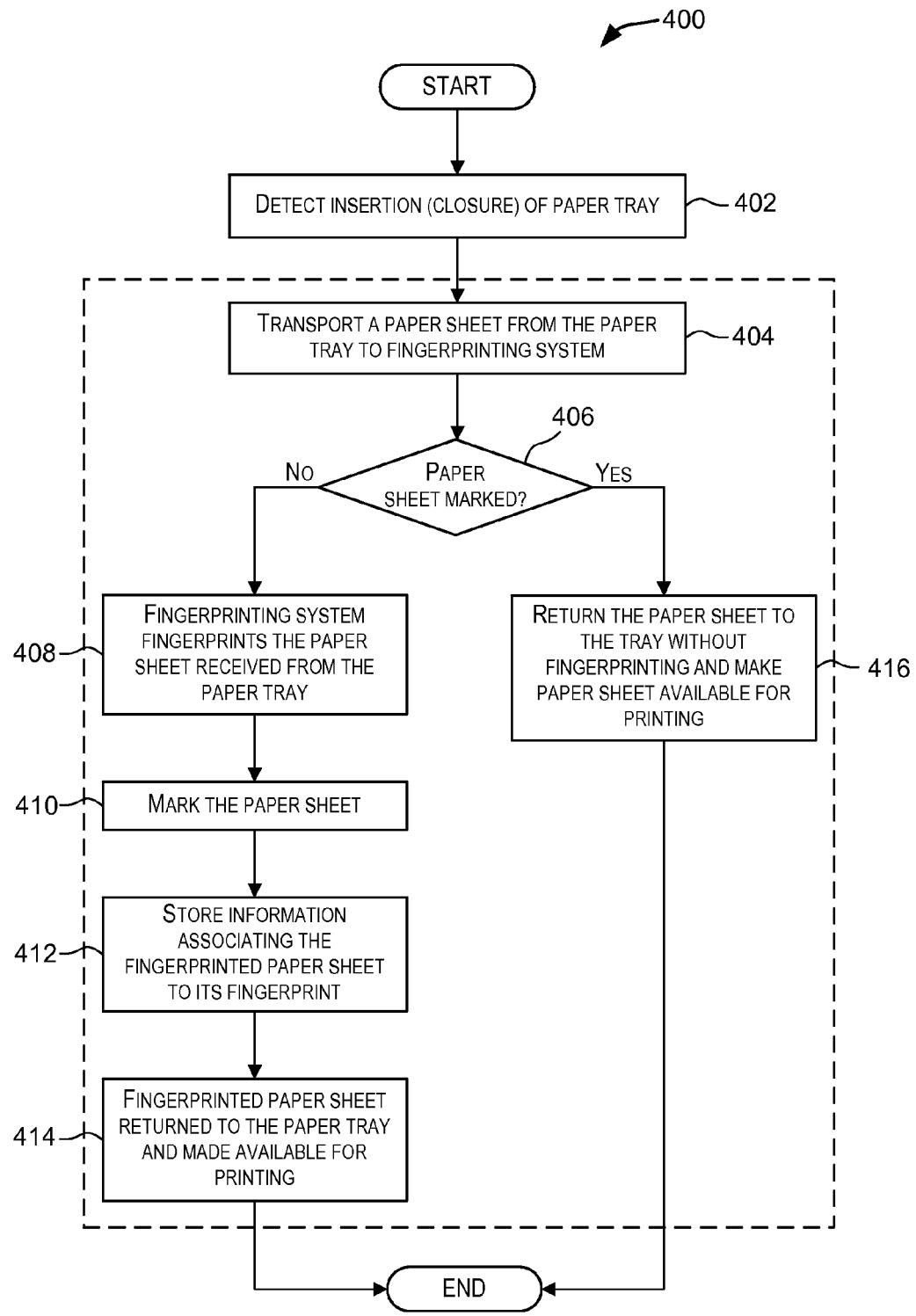
FIG. 4 is a simplified high-level flowchart depicting a fingerprinting process performed by a printer in which fingerprinted paper sheet are marked according to an embodiment of the present invention.

FIG. 4 is a simplified high-level flowchart 400 depicting a fingerprinting process performed by a printer in which the fingerprinted paper sheet is marked according to an embodiment of the present invention. The processing depicted in FIG. 4 may be performed by software modules (code, instructions), hardware modules, or combinations thereof. The processing may be performed by fingerprinting system 106. Flowchart 400 depicted in FIG. 4 is merely illustrative of an embodiment of the present invention and is not intended to limit the scope of the present invention. Other variations, modifications, and alternatives are also within the scope of the present invention.

As depicted in FIG. 4, processing is initiated when insertion of a paper tray is detected (step 402). Step 402 is similar step 302 depicted in FIG. 3. A paper sheet is then transported from the paper tray to the fingerprinting system (step 404). Step 404 is similar to step 304 in FIG. 3. The fingerprinting then determines whether the paper sheet received from the paper tray comprises a mark that can be read by the fingerprinting system and indicates to the fingerprinting system that the paper sheet has been previously fingerprinted and that the fingerprint is known by the fingerprinting system (step 406). If it is determined in 406 that the particular paper sheet has been previously fingerprinted, then the paper sheet is returned to the paper tray without fingerprinting and the paper sheet is made available for printing (step 416).

Steps 408, 410, 412, and 414 are performed only if it is determined in 406 that either the paper sheet contains no mark thereby indicating that it has not been previously fingerprinted or the paper sheet contains a mark that cannot be deciphered by the fingerprinting system. This possibly may be due to the paper sheet being fingerprinted by another machine or the memory being erased. The fingerprinting system scans the paper sheet and generates a fingerprint for the paper sheet (step 408). Step 408 is similar to step 306 in FIG. 3. The paper sheet is then marked to indicate that is has been fingerprinted (step 410). Information is then stored associating the paper sheet with the generated fingerprint (step 412). The information may be stored in a memory associated with the paper tray. Step 412 is similar to step 308 in FIG. 3. In one embodiment, the code used to mark a sheet may be used to identify the paper sheet and may be stored in a database in memory 104 and associated with a fingerprint generated for that sheet. The code may be as a key to find the corresponding fingerprint. The code is used to locate a fingerprint for a paper sheet. The fingerprinted paper sheet is then returned to the paper tray and made available for printing (step 414). Step 414 is similar to step 310 in FIG. 3. Steps 404, 406, 408, 410, 412, 414, and 416 may be repeated for all paper sheets in tray 102.

Various different techniques may be used to mark a paper sheet. In one embodiment, a paper sheet is marked with a machine readable code such as a barcode. For example, for a paper sheet, the code may comprise a unique number, like a serial number which is paired in memory with the paper's fingerprint information. The code may be printed on different locations on the paper sheet such as the bottom of the paper sheet, the top of the paper sheet, etc. Different techniques may be used to print the code on a paper sheet. In one embodiment, an ink may be used for printing the code that becomes transparent when exposed to light for a while. Infrared inks may also be used. In one embodiment, the code may be in the form of a barcode that is readable by fingerprinting system 106 at a very high speed compared to fingerprinting. In one embodiment, steganographic techniques such as subtle color variations may also be used to mark a paper sheet. In general, if a sheet is marked and the marked code is recognized by the printer and the mapping between the code and the known fingerprint information is stored in the printer or tray memory, the paper sheet does not have to be fingerprinted again (and it does not matter if someone took the paper sheets out of the printer tray and shuffled them). The code is thus used to determine whether or not a paper sheet should be fingerprinted. The purpose of the marks is to avoid re-fingerprinting the page in the presence of human actions like reordering the paper in the tray, moving the tray to a different printer, or any other action which would disturb the association between tray and paper position and the scanned fingerprint data.

Figure 5:
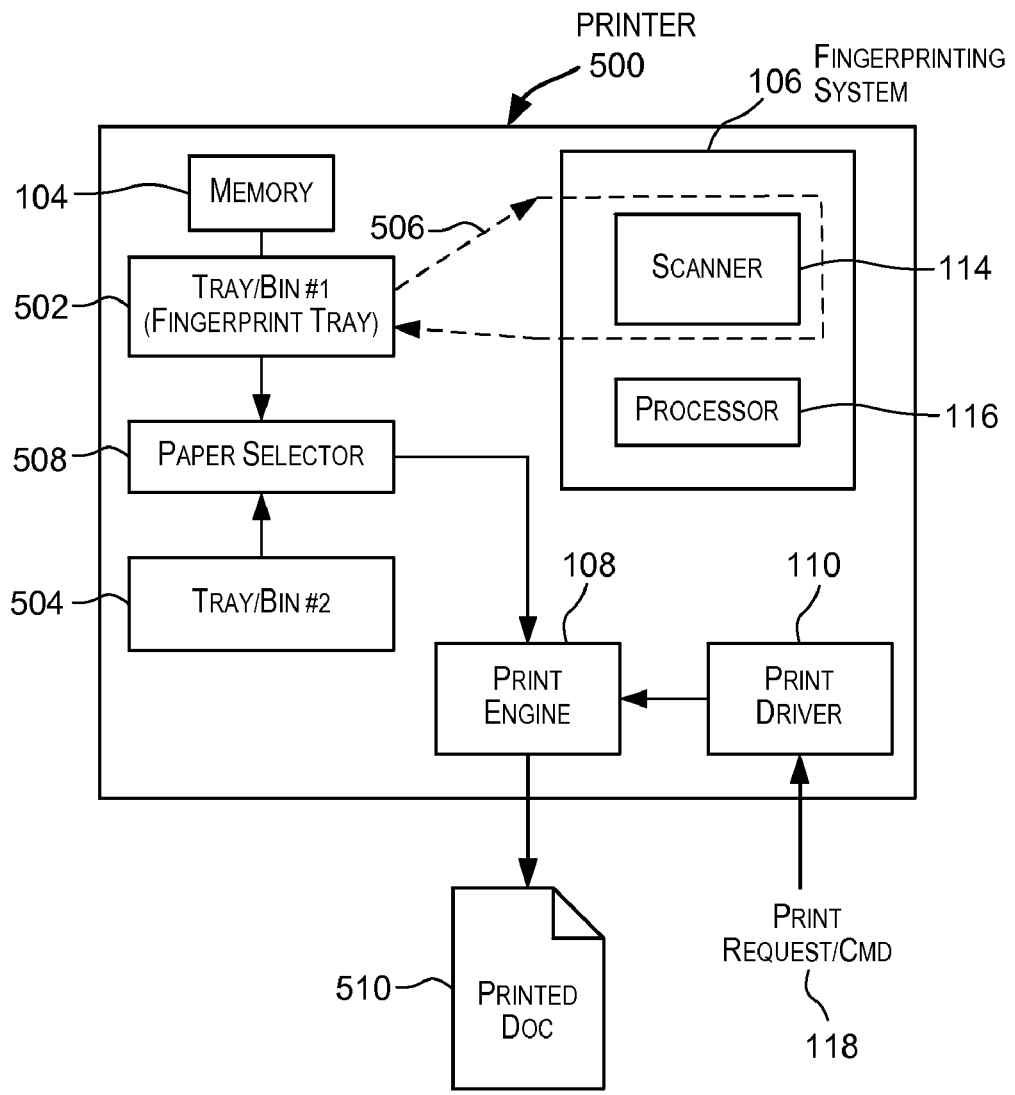
FIG. 5 is a simplified block diagram of a printer that incorporates multiple paper trays according to an embodiment of the present invention.

In the embodiments described above, the fingerprinted paper sheets are returned to the same tray in which the paper sheets were stored in prior to the fingerprinting. In alternative embodiments, in printers with multiple trays, separate trays may be used for storing paper sheets that are to be fingerprinted and sheets that are not fingerprinted. FIG. 5 is a simplified block diagram of a printer 500 that incorporates multiple paper trays according to an embodiment of the present invention. Printer 500 depicted in FIG. 5 is merely illustrative of an embodiment incorporating the present invention and is not intended to limit the scope of the invention as recited in the claims. Embodiments of the present invention may be incorporated into various other systems and devices. One of ordinary skill in the art would recognize other variations, modifications, and alternatives.

Printer 500 is similar to printer 100 depicted in FIG. 1 but has two trays 502 and 504 and a paper selector module 508. Printer 500 is configured such that paper stored in tray 502 is fingerprinted while paper stored in tray 504 is not fingerprinted. Accordingly, tray 502 is used for storing paper sheets that are to be fingerprinted and for storing the fingerprinted sheets after the fingerprinting operation has been performed. The sheets loaded into tray 502 are fingerprinted in the manner as described above for tray 102 in FIG. 1. Fingerprinting system 106 is configured to detect the insertion of tray 502 and fingerprint the paper sheets stored in tray 502. The fingerprinted sheets are then returned back to tray 502 (as indicated by paper path 506). The paper sheets from tray 502 may be fingerprinted according to flowchart 300 depicted in FIG. 3 or flowchart 400 depicted in FIG. 4. Information may be stored in memory 104 associated with tray 502 associating the fingerprinted sheets with their corresponding fingerprints. The information may also be stored in other locations local to printer 500 or remote from printer 500.

Tray 504 (and potentially other trays) is used for storing normal un-fingerprinted paper sheets and paper sheets that will not be fingerprinted. In this manner, in printer 500, the fingerprinted sheets and the non-fingerprinted sheets are segregated from each other into separate trays.

When printer 500 receives a request 118 to print an electronic document, the electronic document is printed to produce printed document 510 by interleaving one or more fingerprinted paper sheets from tray 502 and non-fingerprinted sheets from tray 504. In one embodiment, printer 500 is configured to use at least one fingerprinted paper sheet for producing printed document 510. Interleaving enables a printed document 510 to be produced wherein a subset of the pages of the document are fingerprinted paper sheets.

Paper selector module 508 is configured to select the paper sheets, either fingerprinted paper sheets from tray 502 or non-fingerprinted paper sheets from tray 504, to be used for printing a document such that fingerprinted sheets are interleaved with the non-fingerprinted sheets in generating a printed document 510. In one embodiment, when printer 500 receives a print request/command 118, a signal is sent to paper selector module 508 to initiate the paper sheet selection process. Paper selector 508 then selects one or more sheets from tray 502 and tray 504 for printing the document. The selected paper sheets are then provided in an interleaved manner to print engine 108 for generating printed document 510. In one embodiment, paper selector module 508 ensures that printed document 510 comprises at least one fingerprinted sheet which can then be subsequently used for authenticating the printed document.

Different techniques may be used to interleave fingerprinted paper sheets with non-fingerprinted paper sheets while generating a printed document. In one embodiment, the fingerprinted sheets may be randomly selected and interleaved with non-fingerprinted sheets. In another embodiment, fingerprinted sheets may be selected at regular intervals (e.g., every two pages) and used for generating the printed document, while non-fingerprinted sheets are used for printing the other pages. In one embodiment, the print request/command may specify which pages are to be printed using fingerprinted sheets. For example, the print command may indicate that the first and last page of the document is to be printed on fingerprinted sheets. In this manner, a user who initiates the print command may specify the pages for which a fingerprinted sheet is to be used. Only the specified pages are then printed using fingerprinted paper sheets. Other techniques may also be used for interleaving fingerprinted sheets with non-fingerprinted sheets.

Interleaving of fingerprinted paper sheets with non-fingerprinted paper sheets reduces the number of fingerprinted paper sheets required for printing documents. Only a subset of paper sheets of a printed document need to be fingerprinted sheets, the others can be non-fingerprinted sheets. As a result of the subsetting, the number of fingerprinted sheets that are needed to print a document is reduced. This translates to a reduction in the amount of scanning and fingerprinting that needs to be performed by printer 500. This in turn translates to savings in time and costs by reducing the number of times the expensive fingerprinting process has to be performed.

Figure 6:
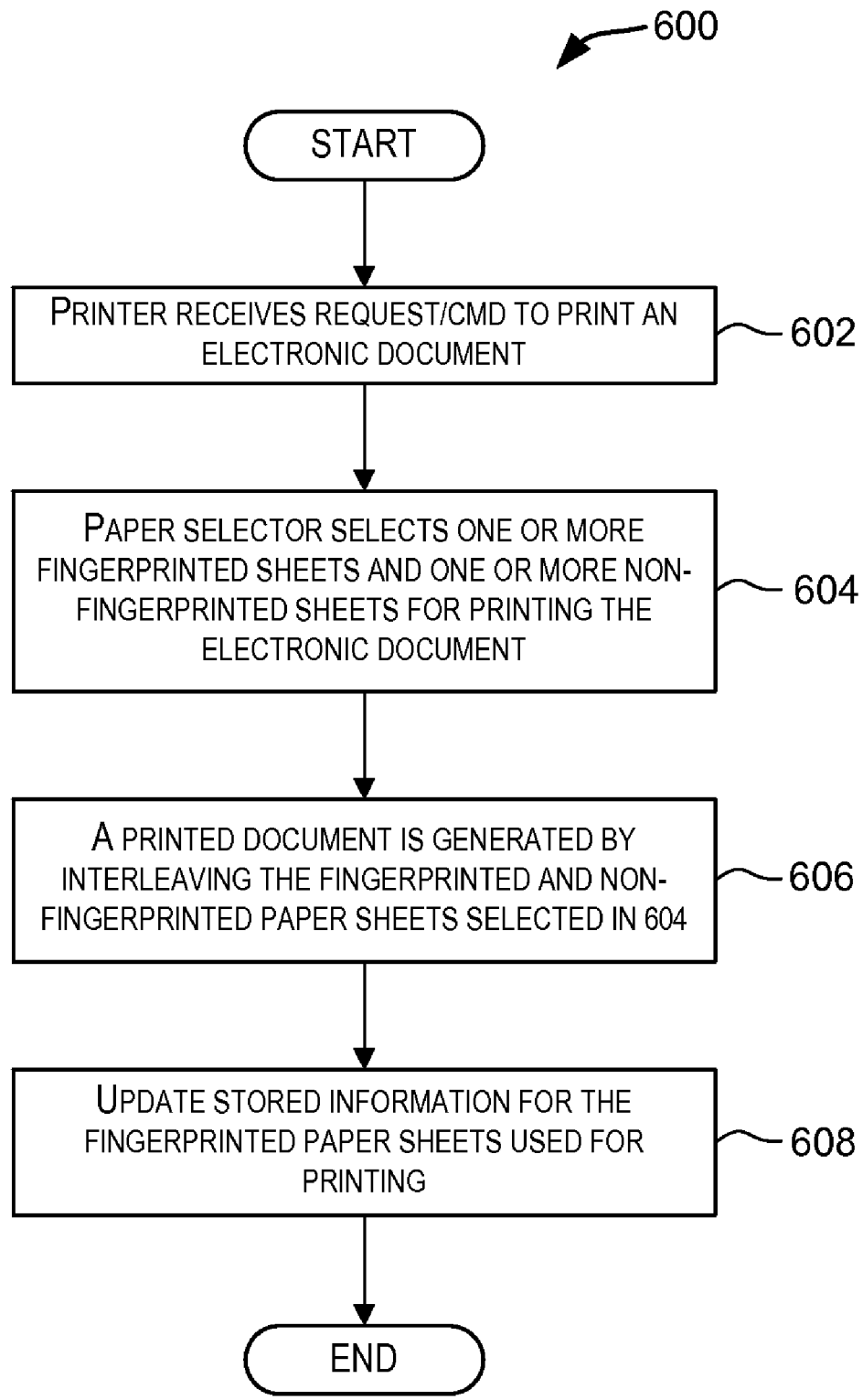
FIG. 6 is a simplified high-level flowchart depicting a method of generating a printed document by interleaving fingerprinted paper sheets with non-fingerprinted paper sheets according to an embodiment of the present invention.

FIG. 6 is a simplified high-level flowchart 600 depicting a method of generating a printed document by interleaving fingerprinted paper sheets with non-fingerprinted paper sheets according to an embodiment of the present invention. The processing depicted in FIG. 6 may be performed by software modules (code, instructions), hardware modules, or combinations thereof. The processing may be performed by printer 500. Flowchart 600 depicted in FIG. 6 is merely illustrative of an embodiment of the present invention and is not intended to limit the scope of the present invention. Other variations, modifications, and alternatives are also within the scope of the present invention.

As depicted in FIG. 6, the printing process is initiated upon receiving a request/command to print an electronic document (step 602). The paper selector module then selects one or more paper sheet from a tray storing fingerprinted sheets or from a tray storing non-fingerprinted sheets to perform the printing (step 604). Various techniques may be used for selecting fingerprinted sheets and non-fingerprinted sheets. In one embodiment, at least one fingerprinted paper sheet may be selected in 604. A fingerprinted paper sheet may be selected randomly or at regular intervals. If the print request/code module specifically identifies pages for which a fingerprinted sheet is to be used, then a fingerprinted paper sheet is selected for printing those specified pages. A printed document is then generated by interleaving the fingerprinted and non-fingerprinted paper sheets selected by the paper selector module in 604 (step 606). Information stored for each fingerprinted paper sheet that is used for printing is then updated (step 608). As previously described, after the fingerprinting operation is performed, information associating the fingerprints with their corresponding paper sheets is stored in a memory. This information may be updated in step 608. After a fingerprinted paper sheet has been used for generating the printed document, the entry for that sheet may be updated with information related to the electronic document which is printed using the sheet. For example, in one embodiment, the entry for a fingerprinted paper sheet may be updated with information identifying the contents printed on that sheet. In another embodiment, the entry for a fingerprinted paper sheet in memory 104 may be updated with information identifying the electronic document or page of the electronic document printed on that sheet.

Figure 7:
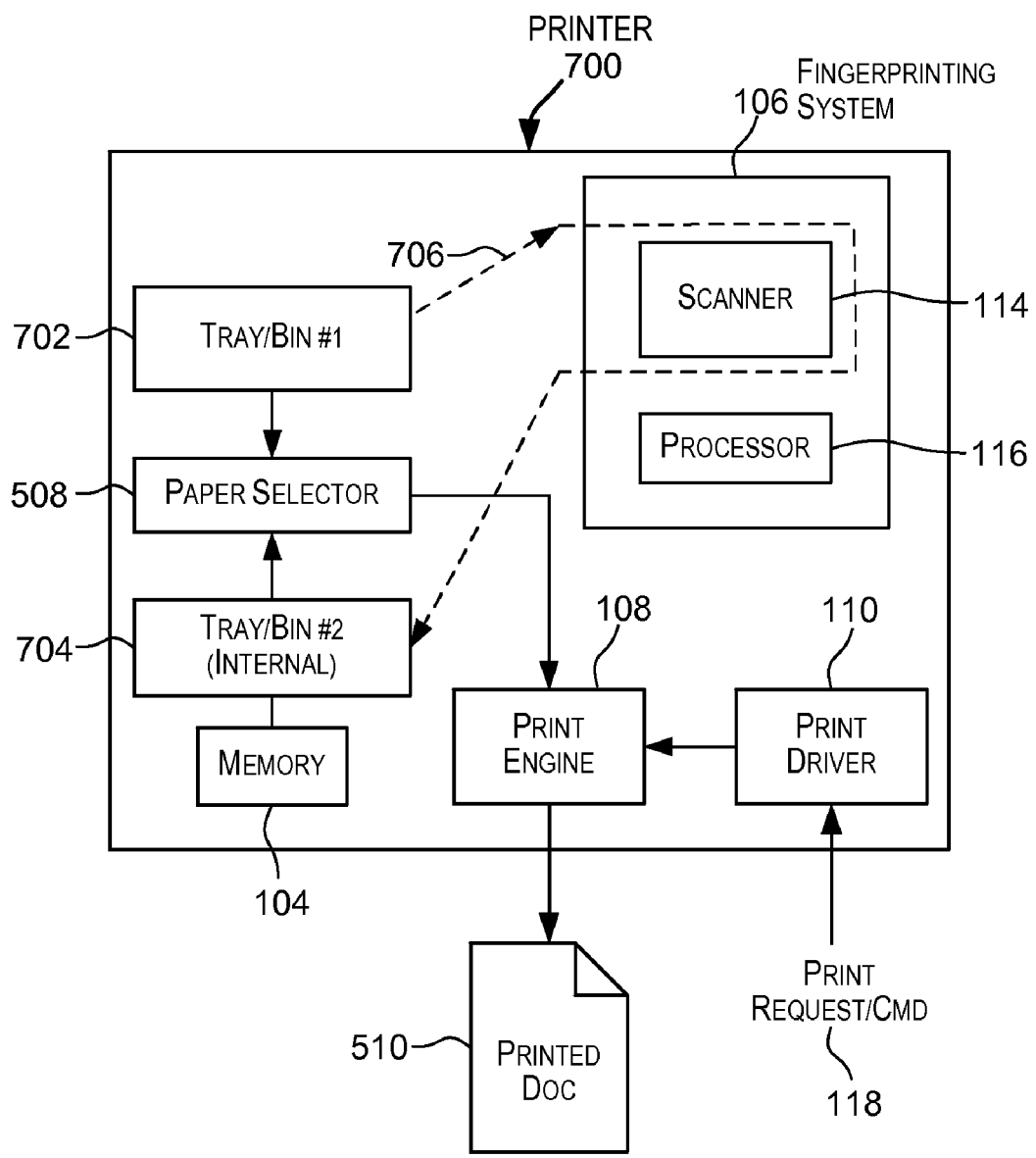
FIG. 7 is a simplified block diagram of a printer wherein paper sheets are selected for fingerprinting from one tray and returned to another tray according to an embodiment of the present invention.

In the embodiments described above, the sheets to be fingerprinted are selected from one tray, sent to the fingerprinting system for fingerprinting, and are then returned to the same tray. In an alternative embodiment, the paper sheets may be selected for fingerprinting from a first tray and after fingerprinting may be forwarded and stored in a second tray that is separate from the first tray. FIG. 7 is a simplified block diagram of a printer 700 wherein paper sheets are selected for fingerprinting from one tray and returned to another tray according to an embodiment of the present invention. Printer 700 depicted in FIG. 7 is merely illustrative of an embodiment incorporating the present invention and is not intended to limit the scope of the invention as recited in the claims. Embodiments of the present invention may be incorporated into various other systems and devices. One of ordinary skill in the art would recognize other variations, modifications, and alternatives.

Printer 700 is quite similar to printer 500 depicted in FIG. 5 with the difference that paper sheets to be fingerprinted are selected from a first tray and after fingerprinting are deposited into a second tray that is separate from the first tray. Accordingly, one or more paper sheets may be loaded into a first tray 702. One or more paper sheets from first tray 702 are selected to be fingerprinted and sent to fingerprinting system 106. After being fingerprinted, the fingerprinted sheets are deposited in a second tray 704 that is separate from first tray 702. The paper path 706 for the fingerprinting process is thus from first tray 702 to fingerprinting system 106 to second tray 704. The fingerprinting process may be initiated by fingerprinting system 106 when the number of fingerprinted sheets in second tray 704 falls below a preconfigured threshold. When the supply of fingerprinted paper sheets fall below the threshold, then paper sheets may be selected from first tray 702 for fingerprinting to replenish the supply in second tray 704. Information associating the fingerprinted sheets with their corresponding fingerprints may be stored in memory 104 associated with second tray 704. In this manner, in printer 700, the fingerprinted sheets and the non-fingerprinted sheets are segregated from each other into separate trays.

In the embodiment depicted in FIG. 7, second tray 704 acts as a cache of fingerprinted paper sheets and printer 700 is able to perform printing at high speed using non-fingerprinted paper sheets from first tray 702 and fingerprinted paper sheets from second tray 704. In one embodiment, second tray 704 that is used for storing the fingerprinted paper sheets may be an internal tray of printer 700 and may not be user accessible.

Not all the paper sheets in first tray 702 need be fingerprinted. Only a subset of the sheets from first tray 702 may be fingerprinted. The sheets may be selected from first tray 702 and fingerprinted at regular intervals or whenever the supply of fingerprinted paper sheets in second tray 704 falls below some preconfigured threshold. Accordingly, paper sheets from first tray 702 are used to replenish the fingerprinted paper sheets in second tray 704.

Upon receiving a print request/command 118, paper selector module 508 is configured to select one or more paper sheets from first tray 702 and second tray 704 for generating printed document 510. The selected sheets are interleaved in generating printed document 510. In one embodiment, when printer 700 receives a print request/command 118, a signal is sent to paper selector module 508 to initiate the paper sheet selection process. Paper selector 508 then selects one or more sheets from tray 702 and tray 704 for printing the document. The selected paper sheets are then provided in an interleaved manner to print engine 108 for generating printed document 510. In one embodiment, paper selector module 508 ensures that printed document 510 comprises at least one fingerprinted sheet which can be used for authenticating the printed document. Different techniques, as previously described, may be used to interleave fingerprinted paper sheets with non-fingerprinted paper sheets while generating a printed document.

Figure 8:
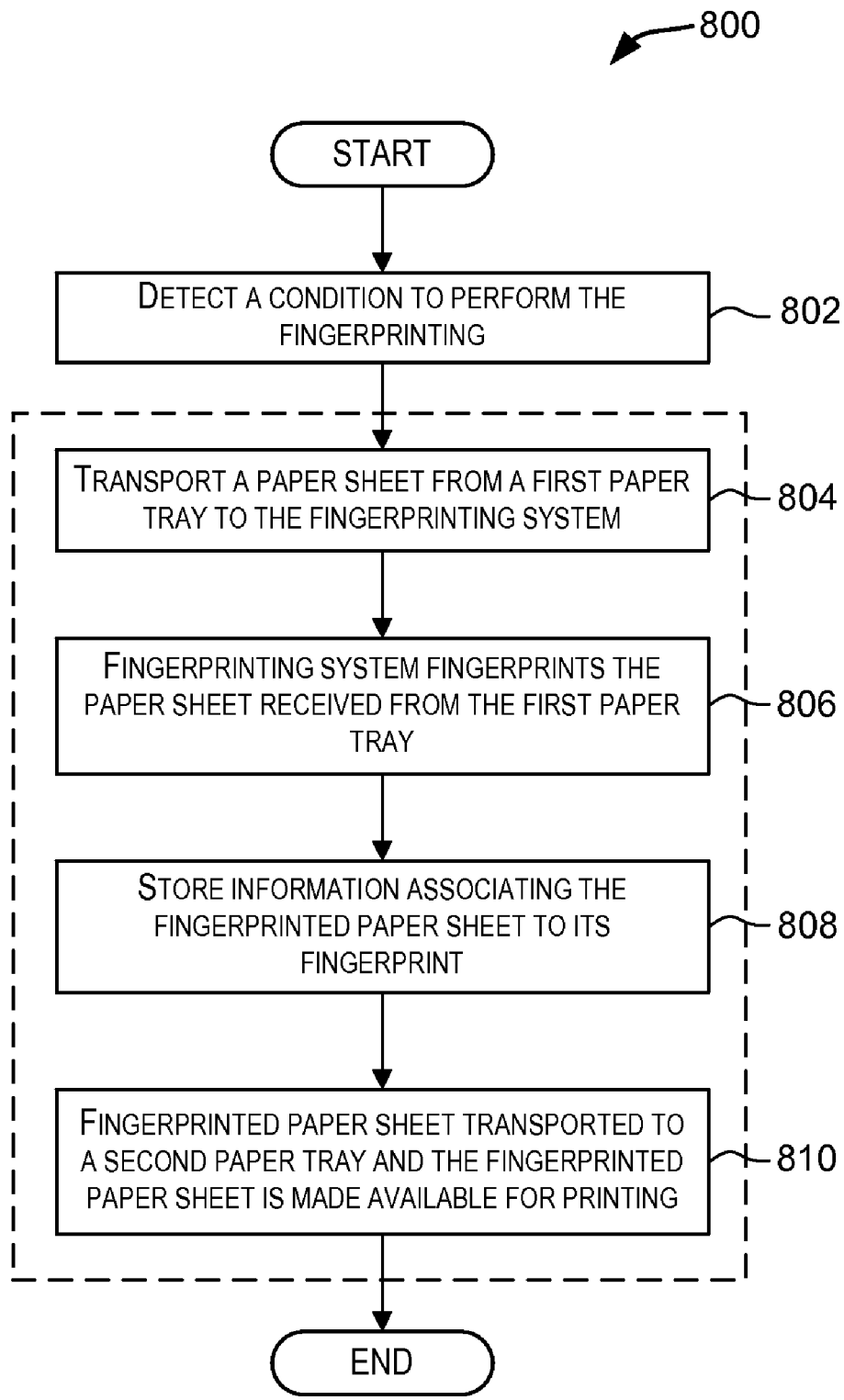
FIG. 8 is a simplified high-level flowchart depicting a fingerprinting process performed by a printer according to an embodiment of the present invention.

FIG. 8 is a simplified high-level flowchart 800 depicting a fingerprinting process performed by a printer according to an embodiment of the present invention. The processing depicted in FIG. 8 may be performed by software modules (code, instructions), hardware modules, or combinations thereof. The processing may be performed by fingerprinting system 106. Flowchart 800 depicted in FIG. 8 is merely illustrative of an embodiment of the present invention and is not intended to limit the scope of the present invention. Other variations, modifications, and alternatives are also within the scope of the present invention.

As depicted in FIG. 8, a condition is detected by the fingerprinting system that causes the fingerprinting system to start the fingerprinting process (step 802). For example, fingerprinting may be initiated when the fingerprinting system detects that the supply of fingerprinted paper sheets has fallen below a preconfigured threshold. The threshold may be user-configurable. A paper sheet is transported from a first paper tray to the fingerprinting system for fingerprinting (step 804). The fingerprinting system scans the paper sheet received from the first paper tray and generates a fingerprint for the paper sheet (step 806). Information is then stored associating the fingerprinted paper sheet with the generated fingerprint (step 808). The information may be stored in a memory associated with a second paper tray where the fingerprinted paper sheet is to be stored. The fingerprinted paper sheet is then transported to a second paper tray that is separate from the first tray and the fingerprinted paper sheet is made available for printing (step 810). Steps 804, 806, 808, and 810 are applied to each paper sheet selected for fingerprinting from the first tray.

As described above, paper sheets are fingerprinted prior to them being available for printing. The fingerprinting is performed offline from the printing process and not as part of the printing process. The fingerprinting operation is thus decoupled from the printing operation. Pre-fingerprinted sheets are then made available for the printing operation. As a result, the fingerprinting operation does not act as a bottleneck for the printing operation since a stack of previously fingerprinted sheets is available for printing. The printing operation may thus be performed at high speeds as desired.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method performed by a printer including a fingerprinting system, the method comprising:
   generating a fingerprint for a first paper sheet from a first tray of the printer by transporting the first paper sheet from the first tray through the fingerprinting system, wherein the first tray includes a plurality of paper sheets;
   transporting the first paper sheet back to the first tray after the fingerprint is generated for the first paper sheet and placing the first paper sheet at a first position in the plurality of paper sheets, wherein the plurality of paper sheets are made available for printing; and
   storing, in a memory, information associating the fingerprint with the first paper sheet, wherein the storing comprises associating the first position of the first paper sheet in the plurality of paper sheets with the fingerprint.

2. The method of claim 1 further comprising:
   receiving a request to print an electronic document;
   selecting at least one fingerprinted paper sheet from the first tray for printing the electronic document; and
   generating a printed document using the at least one fingerprinted paper sheet from the first tray.

3. The method of claim 2 further comprising selecting a non-fingerprinted paper sheet from a second tray of the printer different from the first tray and wherein generating the printed document comprises using the non-fingerprinted paper sheet for generating the printed document.

4. The method of claim 2 wherein the request to print specifies a page of the electronic document for which a fingerprinted paper sheet is to be used for printing the electronic document.

5. The method of claim 2 further comprising storing information for the at least one fingerprinted paper sheet associating the fingerprint generated for the at least one fingerprinted paper sheet with information related to the electronic document.

6. The method of claim 5 wherein the information related to the electronic document comprises information related to contents of the electronic document printed on the at least one fingerprinted paper sheet.

7. The method of claim 1 further comprising:
   determining if the first paper sheet received from the first tray comprises a mark indicating that the first paper sheet has been previously fingerprinted; and
   wherein generating a fingerprint for the first paper sheet comprises generating a fingerprint for the first paper sheet only if it is determined that the first paper sheet does not comprise the mark or the first paper sheet comprises a mark that is not decipherable by the printer.

8. The method of claim 1 wherein generating the fingerprint is performed upon detecting insertion of the first tray in the printer.

9. The method of claim 1 wherein generating the fingerprint comprises marking the first paper sheet to indicate that the first paper sheet has been fingerprinted.

10. The method of claim 9 wherein marking the first paper sheet comprises printing a code on the first paper sheet wherein the code is at least one of a barcode, a code printed using infrared ink, and a code printed using an ink that becomes transparent upon exposure to light.

11. The method of claim 1 wherein the fingerprinting system comprises a scanner.

12. A printer comprising:
   a first tray for storing a plurality of paper sheets;
   a fingerprinting system configured to generate a fingerprint for a first paper sheet from the first tray, by transporting the first paper sheet from the first tray through the fingerprinting system;
   wherein the first tray is configured to receive the first paper sheet back from the fingerprinting system, at a first position in the plurality of paper sheets, after the fingerprinting system has generated the fingerprint for the first paper sheet, and the plurality of paper sheets are made available for printing upon the first tray receiving the first paper sheet back from the fingerprinting system; and
   a memory configured to:
      store information associating the fingerprint with the first paper sheet by associating the first position of the first paper sheet in the plurality of paper sheets with the fingerprint.

13. The printer of claim 12 further comprising a print module configured to:
   receive a request to print an electronic document;
   select at least one fingerprinted paper sheet from the first tray for printing the electronic document; and
   generate a printed document using the at least one fingerprinted paper sheet from the first tray.

14. The printer of claim 13 wherein the print module is configured to select a non-fingerprinted paper sheet from a second tray different from the first tray and generate the printed document using the non-fingerprinted paper sheet.

15. The printer of claim 13 wherein the request to print specifies a page of the electronic document for which a fingerprinted paper sheet is to be used for printing the electronic document.

16. The printer of claim 13 wherein the memory is configured to store information for the at least one fingerprinted paper sheet associating the fingerprint generated for the at least one fingerprinted paper sheet with information related to the electronic document.

17. The printer of claim 16 wherein the information related to the electronic document comprises information related to contents of the electronic document printed on the at least one fingerprinted paper sheet.

18. The printer of claim 12 wherein the fingerprinting system is configured to:
   determine if the first paper sheet received from the first tray comprises a mark indicating that the first paper sheet has been previously fingerprinted; and
   generate a fingerprint for the first paper sheet only if it is determined that the first paper sheet does not comprise the mark or the first paper sheet comprises a mark that is not decipherable by the printer.

19. The printer of claim 12 wherein the fingerprinting system is configured to generate the fingerprint upon detecting insertion of the first tray in the printer.

20. The printer of claim 12 wherein the fingerprinting system is configured to mark the first paper sheet to indicate that the first paper sheet has been fingerprinted.

21. The printer of claim 20 wherein the fingerprinting system is configured to print a code on the first paper sheet wherein the code is at least one of a barcode, a code printed using infrared ink, or a code printed using an ink that becomes transparent upon exposure to light.

22. The printer of claim 12 wherein the fingerprinting system comprises a scanner configured to receive the first paper sheet from the first tray.

23. The method of claim 9 wherein marking the first paper sheet comprises using a steganographic technique to mark the paper sheet.

24. The printer of claim 20 wherein the fingerprinting system is configured to use a steganographic technique to mark the first paper sheet.

* * * * *